April 26, 1932. C. G. ABBOT 1,855,815
APPARATUS FOR UTILIZING SOLAR HEAT
Filed Aug. 19, 1929 2 Sheets-Sheet 2
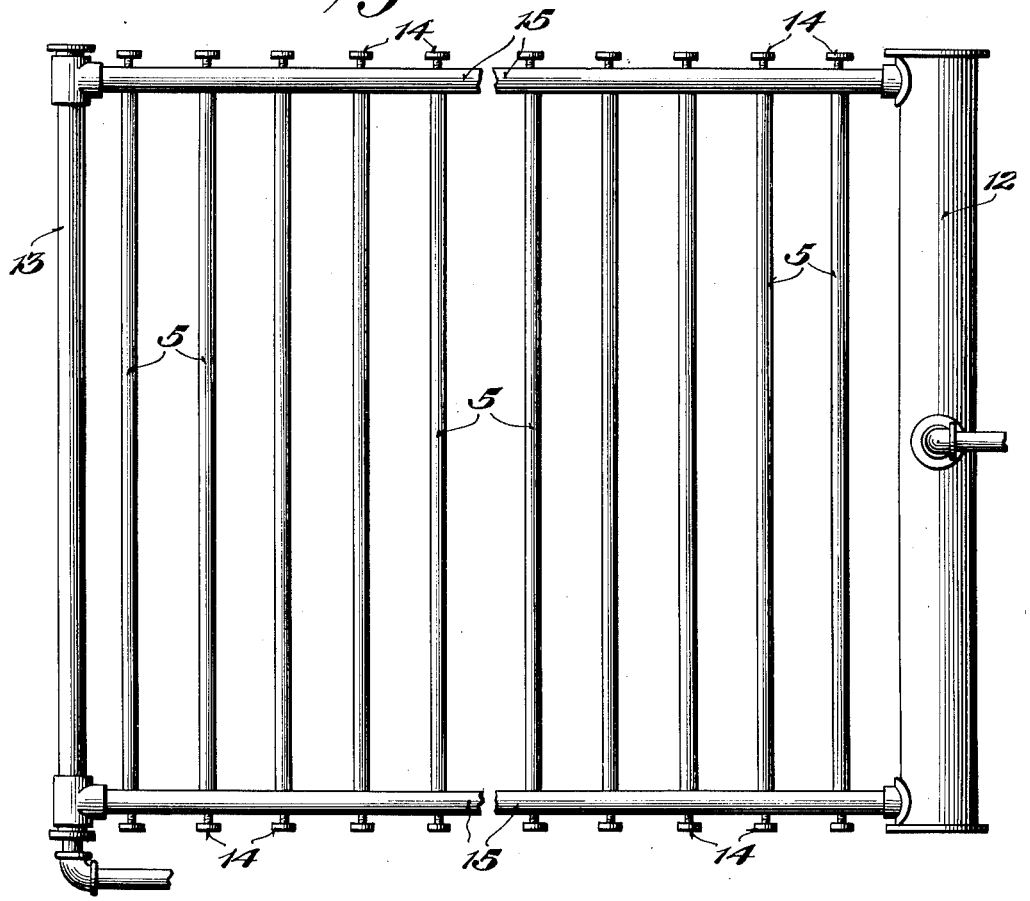
Inventor
C. G. Abbot,
By Dorsey Cole
Attorney Patented Apr. 26, 1932

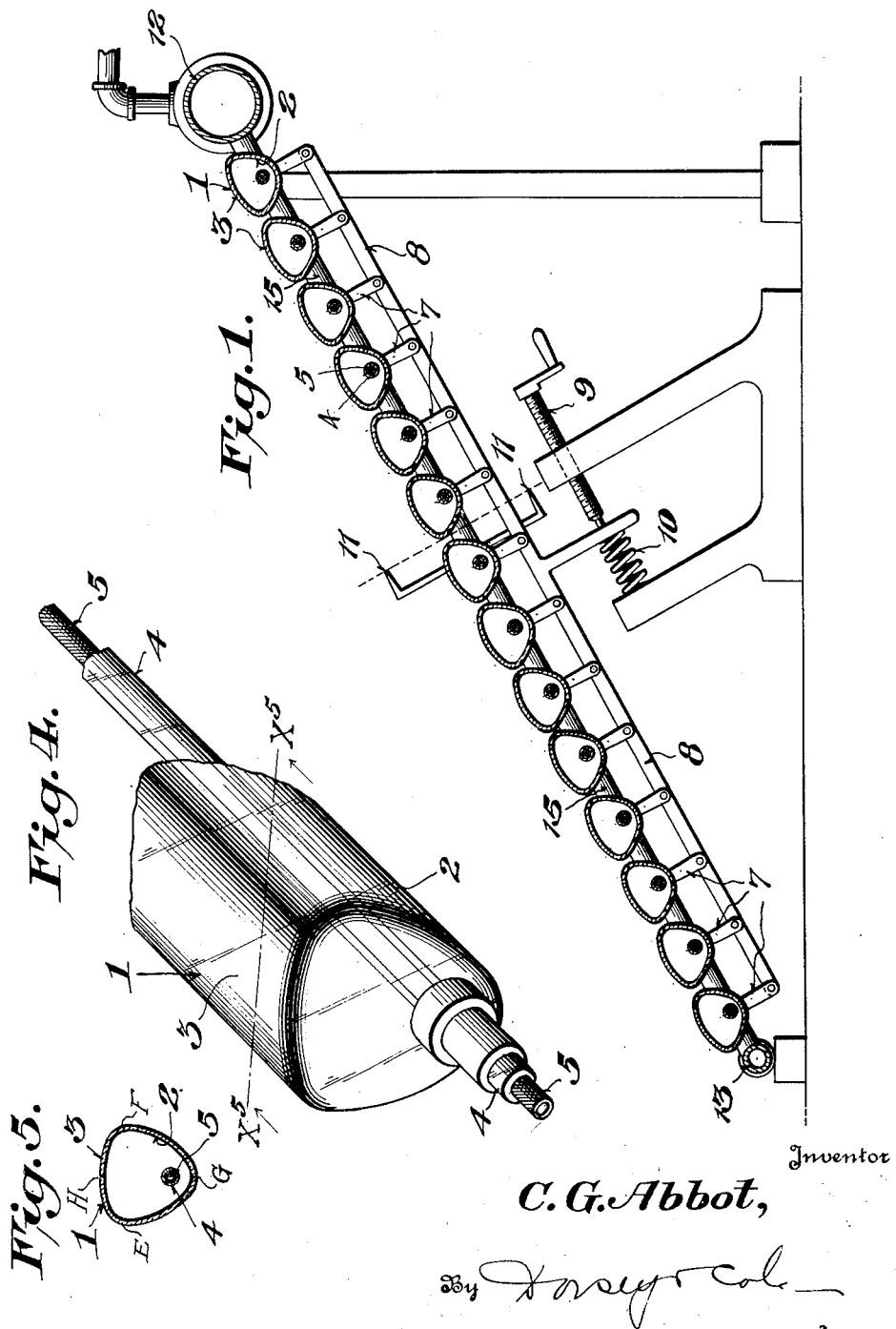

1,855,815

UNITED STATES PATENT OFFICE

CHARLES GREELEY ABBOT, OF WASHINGTON, DISTRICT OF COLUMBIA

APPARATUS FOR UTILIZING SOLAR HEAT

Application filed August 19, 1929. Serial No. 386,862.

This invention relates to apparatus for absorbing the heat of solar radiation and for rendering it useful for various purposes, such as heating liquids for domestic purposes, or for evaporation, and especially for the production of power in steam engines.

In this application, my objects are to provide cheap and efficient means for concentrating the rays of the sun from large areas of exposure on to small ray-absorptive pipes arranged in a manner adapted to serve as units of steam boilers, and to effectively insulate these pipes from losses of heat.

Novel means for the attainment of these objects comprise certain evacuated hollow structures, in part transparent, in part reflecting, and the arrangement for rotary manipulation of them. These structures are units, each of which encloses a unit boiler tube, and is adapted to concentrate thereon the sun rays from a considerable area, while hindering the escape therefrom of the heat thereby produced. The units of a series of such structures lie parallel each to each in a particular orientation (hereinafter described) such that a simple linkage enables an attendant to readily adjust them simultaneously at intermittent intervals, so as to preserve the linear foci of their reflecting parts coincident with the unit boiler tubes.

I am aware that the use of evacuated hollow members enclosing boiler tubes in combination with reflectors is not novel. The novelty of my construction consists in the shape of construction of the units and such an assembly and orientation of several units as to permit the simplification of the mechanism required to retain focus of solar rays on the boiler tubes.

The apparatus herein described having been designed by me with these objects in view, and my invention consisting in the construction, arrangement and combination of parts of which it is composed, these features will hereinafter be more fully described and claimed.

Referring to the accompanying drawings in which corresponding parts are designated by corresponding marks of reference,—

Figure 1 is a vertical section through a device embodying my invention.

Figure 2 is a plan view, with the glass members removed of the boiler thereof.

Figure 3 is an enlarged plan partially in section of a single element thereof.

Figure 4 is an enlarged perspective view, partially broken away, of one of the boiler elements and the corresponding reflector.

Figure 5 is a cross section on lines $X^5$—$X^5$ of Figure 4, on a reduced scale.

As shown in the drawings, the device in its preferred form includes a series of evacuated, hollow, transparent (glass) members 1, forming tubes of a special cross-section. The posterior part 2 thereof (see curve EGF, Figure 5), is preferably of approximately parabolic curvature, the anterior part 3 thereof (see curve EHF, Figure 5), being of any convenient arched shape suitably curved to resist collapse under atmospheric pressure. A transparent focus-tube 4, of an internal diameter suitable to easily enclose the metallic boiler tube 5, and lying longitudinally within the hollow member, is sealed into the ends of the hollow member so as to include concentrically the line of focus of the parabolic part thereof. The parabolic part (EGF, Figure 5) of the hollow member is silvered, or otherwise plated, so as to be rendered highly reflective of solar rays. Such silvering, or plating, is preferably applied on the inside wall of the hollow member, but may be applied instead on its outside wall if more convenient.

Metallic boiler tubes 5, blackened to absorb solar rays, are inserted within the focus tubes. Each evacuated hollow member and enclosed focus tube is so mounted that they (i. e., each hollow member and the focus tube therein) may be rotated about the axis of the boiler tube 5. The free spaces between the ends of the focus tubes and the boiler tube are reduced to prevent free passage of air.

The orientation of the hollow members 1, is preferably as follows: They lie in a parallel series forming a planar configuration, whose plane is at right angles to the plane of the meridian and preferably, though not necessarily, parallel to the earth's axis. The longer axes of the hollow members are approximately horizontal, and at right angles to the plane of the meridian. Being rotatable about the axes of the boiler tubes, each hollow member is provided with a suitable handle 7, and with a connecting linkage 8, whereby all such hollow members of a series may be rotated simultaneously through an angle of 60°, or more or less. The screw and spring 9, 10, shown in Figure 1 or equivalent means, is adapted for this purpose. This linkage is so adjusted that all the hollow members are oriented similarly with respect to the sun at all times, whatever be the angle of setting by the linkage. There is provided a gnomon, 11, 11, to indicate the common orientation of said hollow members with respect to the position of the sun in the sky.

By these means an attendant, or, if preferred, an automatic mechanism, operated by clockwork (not shown here), may keep all the hollow members properly oriented continually so that the axes of their parabolic cross-sectional curves shall all lie in planes including the center of the sun. Under these circumstances the rays of the sun will continually focus upon the boiler tubes, independently of the altitude of the sun above the horizon. In such a manner the orientation is accomplished by such simple mechanism as thus far described, requiring only slight and intermittent attention by the attendant, without the use of elaborate clockwork or costly mechanisms such as are ordinarily used to focus sun rays in astronomical instruments or solar engines.

The evacuated hollow members are preferably made in lengths approximating 3 feet, more or less, and of any convenient diameter, as 7 inches more or less. They are associated in series covering an inclined planar area of 6 by 10 feet more or less, all operated by a single linkage, as above described. Other similar series may be situated adjacent thereto. Thus large areas, suitable to the collection of immense quantities of solar energy, may be utilized in one power plant. In such cases it is only necessary to connect the boiler tubes protruding from the several focus tubes into such a system or systems as those skilled in the art of steam engineering will immediately conceive, and providing for them, if necessary, suitable means of circulating the contained fluid protecting outlying pipes by suitable heat insulation, and connecting into such system of piping appropriate steam chests 12, fluid injectors 13, and the usual accessories required to operate steam engines. As it is necessary to clean the boiler tubes occasionally, screw plugs 14, 14 (Figure 2) may be provided in the header pipes 15, 15, opposite to the several boiler tubes 5, enabling the attendant occasionally to clean away mud and scale by the insertion of suitable cleaning rods.

Although this orientation of the device before described is most suitable for boiler installations for power purposes, I do not restrict myself to it, but may use other orientations for special purposes. For example, in heating liquids for domestic purposes it may in certain cases be preferable to place the boiler tube or tubes parallel to the earth's axis.

Having thus described my invention what I claim is:—

1. A solar heating element comprising an elongated evacuated glass container having its posterior portion parabolic in cross section, a mirror on the surface of the parabolic portion of the container, and a boiler tube located in front of and at the linear focus of the mirror.

2. The combination in a device for utilizing solar energy, of an evacuated annular member comprising a cylindrical outer shell and a transparent tube fixed longitudinally therein; said outer shell having a posterior reflecting portion adapted to reflect solar rays to a linear focus, and having a transparent anterior portion adapted to admit solar rays toward said reflecting portion; a heat-absorbing boiler tube extending lengthwise through the transparent tube and lying substantially in the focus of said reflecting posterior portion, the whole structure being adapted to admit solar rays over an area and to bring them to linear focus upon said ray-absorbing boiler tube.

3. In a device for utilizing solar energy, the combination of a plurality of solar heating elements, each element comprising a boiler tube, a mirror adapted to focus parallel rays on said boiler tube and rotatable thereabout as an axis, and a double walled evacuated partly transparent sheath enclosing said boiler tube, said tube being fixed in an east and west position, the said heating elements forming a planar grid at right angles to the plane of the meridian; and a linkage connecting the mirrors of the several elements to rotate them severally about the axis of said tubes in unison, substantially as described.

In testimony whereof I hereunto affix my signature.

CHARLES GREELEY ABBOT.